Dec. 30, 1969  F. J. CALLAHAN, JR., ETAL  3,486,775

FITTING

Filed July 31, 1968

INVENTORS.
FRANCIS J. CALLAHAN, JR. &
ERLING G. WENNERSTROM
BY
*Fay, Sharpe & Mulholland*

ATTORNEYS

United States Patent Office 3,486,775
Patented Dec. 30, 1969

1

3,486,775
FITTING
Francis J. Callahan, Jr., Chagrin Falls, and Erling G. Wennerstrom, Mayfield, Ohio, assignors to Cajon Company, Solon, Ohio, a corporation of Ohio
Continuation-in-part of application Ser. No. 478,830, Aug. 11, 1965. This application July 31, 1968, Ser. No. 749,026
Int. Cl. F16l 33/18, 19/02
U.S. Cl. 285—348                              2 Claims

ABSTRACT OF THE DISCLOSURE

A vacuum fitting having a body with an extension thereon and a passage through both the body and the extension. A nut, having a cavity and an inwardly directed flange defining an opening substantially equal in diameter to the passage through the body, is threadedly engaged with the body. A sleeve is disposed in the cavity in the nut and forms with the fitting a groove which receives a resilient O-ring sealing means.

BACKGROUND OF THE INVENTION

This is a continuation-in-part of our copending application Ser. No. 478,830, filed Aug. 11, 1965, now abandoned. Couplings incorporating a sealing O-ring in a groove to be compressed between two flat surfaces are well known in the art. However, some engineering problems exist in the conventional O-ring type of tube fitting which limit their design application and utility. One such problem is retaining the O-ring in its cavity and preventing accidental loss or displacement before the coupling connection is made. To hold the ring in place properly when the fitting is not yet incorporated in a fluid system one must make a cavity of a depth greater than one half of the diameter of the O-ring. This allows the sides of the cavity to project slightly beyond the center line of the O-ring and contact the outermost and innermost diameters of the O-ring to frictionally hold it in place.

This, of course, places an immediate limitation on the amount of compression which may be exerted on the O-ring. The maximum amount of displacement which may be applied is the amount the O-ring projects beyond the edges of the cavity. Conventionally, a flat surface comes into contact with the exposed part of the O-ring which projects beyond the cavity. The compressing force of the face causes the O-ring to deform in all directions. The ordinary resilient O-ring is not "compressible" in the conventional sense; it simply deforms into the available space. The volume of the resilient material will not be changed as a result of the pressure by the flat face abutting and deforming the O-ring. Part of the deformed volume will be absorbed by voids within the cavity; some of the O-ring will be deformed inward into contact with whatever is on the inner surface and part will deform outward. This outward deformation in some cases is very undesirable. In a tube coupling for example, such outward deformation could allow a portion of the O-ring to be pinched between the flat face and the face of the body holding the fitting. Of course, when a seal such as an O-ring is pinched, abraded or cut in any manner it very quickly reduces the effectiveness of the seal necessitating replacement.

Thus, there are two problems in the art which need a solution and which are solved by this invention. The two problems are: (1) a limitation on the force which may be exerted to deform the O-ring and (2) pinching of the O-ring between two abutting faces.

BRIEF DESCRIPTION OF THE INVENTION

This invention relates to tube fittings and more particularly to a fitting specifically adapted for use in a high vacuum system. The fitting of the instant invention comprises a tubular body adapted to receive the end of a length of tubing and having means to provide a fluid-tight seal between the body and the tube. In this respect, the opposite ends of the body are each provided with an annular recess or counterbore having a tapered inner end. The recess is adapted to receive an O-ring of resilient sealing material which surrounds the tubing when the latter is in place in the fitting. An axially elonagted annular washer is disposed in the recess about the tubing and behind the O-ring. An apertured nut cooperates with external threads on the body of the fitting to force the washer axially inwardly of the recess thereby to press the O-ring against the inner end of the recess. Through the coaction of the O-ring, the washer and the tapered inner end of the recess, the O-ring is expanded radially inwardly into fluid-tight engagement with the tubing thereby effecting the desired seal. The washer is in a closely fitting relationship to the interior of the recess so that there is a minimum of tilting movement which the washer can perform. In such circumstances, the possibility that the washer will become misaligned with the passageway through the tubular fitting is largely obviated. Moreover, the O-ring is securely mounted as by a press fit between the washer and the recess in the body thereby precluding the possibility that the O-ring will be pushed through the fitting as the tube is inserted in the body.

It is an object of this invention to provide a fitting which is adapted for use in a high vacuum system but which is also usable with a pressurized system.

A further object of this invention is to provide a fitting which may be assembled on a tube, and sealed thereto by compression of an O-ring which is deformed radially into contract with the tubular member.

Another object of this invention is to provide a fitting in which the insertion of the tubing into the fitting is faciliated.

It is an object of this invention to provide a tube fitting in which the sealing engagement of the fitting with a piece of tubing is independent of dimensional variation in the tubing.

A further object of this invention is to provide a tube fitting including a washer which is adapted to project into the cavity holding an O-ring to deform the O-ring to such an extent that the washer contacts the drill point of the cavity holding the O-ring.

Another object of this invention is to provide a fitting which may be assembled on a tube, and sealed thereto by compression of an O-ring which is deformed radially into compression with the tubular member, where the tubular member is as much as one sixteenth of an inch smaller in outside diameter than the maximum size of tubing adapted to be incorporated with the fitting.

Other objects and features will become more apparent upon a complete reading of the following specification which sets forth in detail but a few of the approved means of carrying out the invention. Such disclosed means are not meant to be limiting inasmuch as they constitute but a few of the various ways in which the principles of the invention may be applied.

BRIEF DESCRIPTION OF THE DRAWINGS

In the drawings wherein like reference numerals indicate like parts in the various views.

PREFERRED EMBODIMENT

Figure 1:
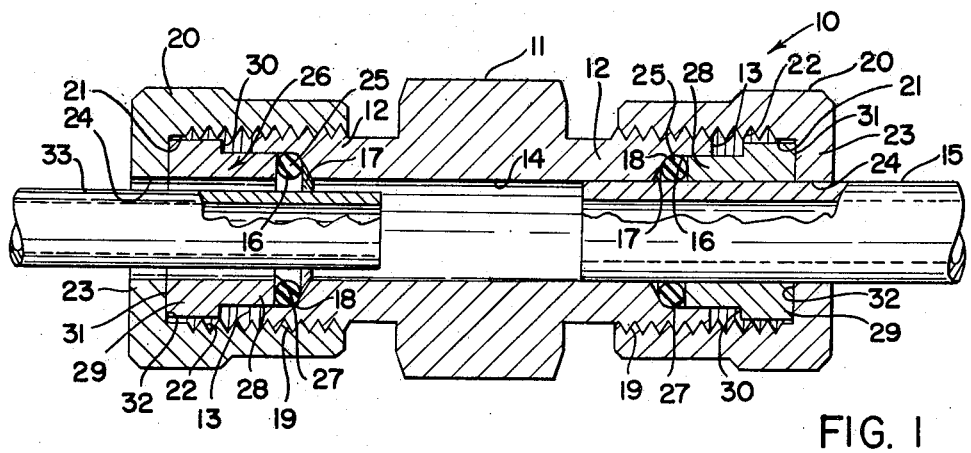
FIG. 1 is a side elevational view in section showing the relation of parts of the invention with a tube of normal diameter at the right end and a tube of undersize diameter at the left end.

Turning to FIG. 1, there is illustrated a vacuum fitting, indicated generally by the reference numeral 10, which comprises the instant invention. This fitting is composed of a body portion 11 which, in the embodiment of FIG. 1, has extending from either end thereof axially elongated, cylindrical extensions 12 having radial faces 13. A through passage 14 having a substantially horizontal axis as viewed in FIG. 1 is formed in the body 11 and the extensions 12 and is adapted to receive tubes 15 and 33. By way of illustration, FIG. 1 shows tubes projecting into the fitting, a tube 15 of normal diameter extending into the right end and an undersize tube 33 extending into the left end.

The extensions 12 each include a counterbored mouth portion or recess 16 which is coaxial with the passage 14. At the juncture of the counterbore 16 and passage 14, there is provided a tapered shoulder 17 which opens radially outward of the passage 14 and merges with the outer cylindrical surface of the counterbore at the bore point 18.

Threads 19 are provided on the exterior periphery of the cylindrical portions 12. Adapted to be received over each cylindrical extension 12 is a nut or cap 20 which includes a central cavity 21 of a diameter substantially equal to the diameter of the cylindrical extension 12. Threads 22 are formed in the central cavity 21 and are adapted to mate with the threads 19 on the cylindrical extension 12. The nut further includes an inwardly extending flange 23 which defines a central passage or aperture 24 through the nut 20. The diameter of the passage 24 is substantially equal to the diameter of the passage 14 and is adapted to receive the normally diametered tube 15 therethrough.

Disposed in the counterbored recess 16 is an O-ring 25. The O-ring is of an elastomeric material and is press fitted in the counterbore 16 adjacent to the tapered shoulder 17. The inner diameter of the O-ring is slightly less than the diameter of the passage 14 so that the O-ring extends into the passage a slight amount and is engageable by the tubing 15 when it is inserted in the passage. The outer diameter of the O-ring 25 is slightly greater than the diameter of the counterbore 16 so that the natural resilience of the O-ring tends to retain it in frictional engagement with the counterbore 16. This arrangement prevents the displacement of the O-ring as the tube is inserted in the passage.

Adjacent to the O-ring 25 in the counterbore 16 is a flanged sleeve or washer 26. This sleeve is of an axially extended cylindrical configuration and is normally composed of the same material as the material from which the body and nut are constructed. As is readily apparent from an inspection of FIG. 1, the sleeve 26 is adapted to extend into the counterbore 16 until the forward face 27 of the sleeve which extends substantially normal to the axis of passage 14 encounters the bore point 18. The inner diameter of the washer 26 is substantially equal to the diameter of passage 14 and aperture 24 and is slightly greater than the outer diameter of the tube which is to be inserted in the fitting. The outer diameter of the forward end 28 of the sleeve 26 closely approximates the diameter of the counterbore 16. A radially extending peripheral flange 29 having radial faces 30 and 31 projects from the outer end of the sleeve 26. The flange 29 has a diameter that is slightly less than the crest diameter of the threads 22 thereby providing a close fit between the flange and the walls of the cavity 21. It is readily apparent that the sleeve is supported around its entire periphery and is thereby restrained from any tilting or canting movement which might inhibit the introduction of the tubing into the fitting 10. Moreover, the accurate mounting of the sleeve 26 assures uniform compression of the O-ring 25.

The combination of the sleeve 26 and the counterbore 16 with its shoulder 17 provides a groove in which the O-ring 25 is securely mounted. This groove prohibits the possibility that the O-ring might be displaced as the tube is inserted in the fitting 10.

The flange 29 serves the function of preventing tilt within the fitting, it prevents flexing of the tube after it is inserted and it adds strength to the sleeve generally.

Figure 3:
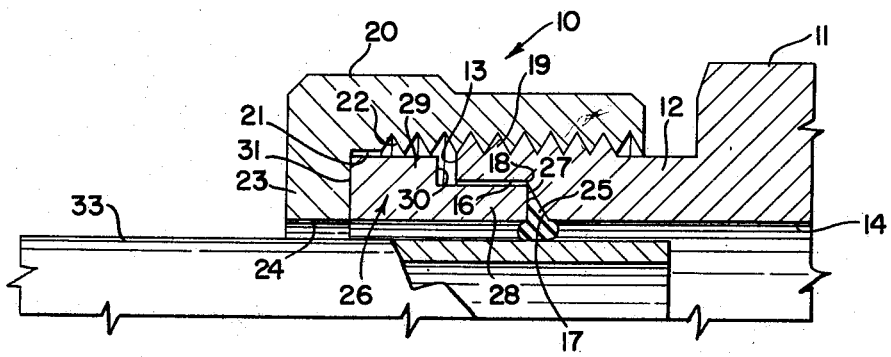
FIG. 3 is an enlarged sectional view of a portion of the fitting illustrating the position of the parts where an undersized tube is sealed to the body.

It is contemplated that the flange 29 will have an axial length such that there is a clearance between the forward face 30 of the flange and the radial face 13 of the coupling body at all times. The nut 20 is adapted to be tightened until the forward face 27 of the sleeve 26 strikes the bore point 18 with clearance remaining between faces 13 and 30, as illustrated in FIG. 3. Such extended tightening at the nut 20 may be necessary when an undersize tube 33 is inserted in the fitting.

Figure 2:
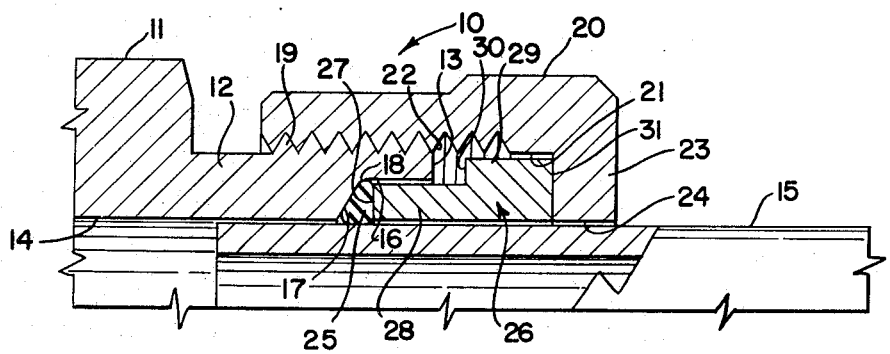
FIG. 2 is an enlarged sectional view of a portion of the fitting illustrating the position of the parts where a tube of normal diameter is sealed to the body.

In operation, the fitting is in the position shown in FIG. 1 with the nuts loosely assembled on the cylindrical extensions 12. A tube 15 is introduced through the passage 24, sleeve 26 and O-ring 25 into the passage 14. With the tube in the desired position within the fitting 10, the nut 20 is tightened on the cylindrical extension 12 until the surface 32 on the inwardly turned flange 23 of the nut 20 abuts the radial face 31 of the sleeve 26. Continued rotation of the nut 20 imparts a longitudinal movement of the sleeve 26 into engagement with the O-ring 25. The O-ring, being in abutment with the tapered shoulder 17, is deformed and expanded radially inwardly into sealing engagement with the exterior of the tube 15. FIGS. 2 and 3 show the general shape of the O-ring in the sealed joint with tubes of diverse diameters.

There being a substantial clearance between radial faces 13 of the body and 30 of the sleeve, the degree of engagement of the O-ring 25 and tube 15 is limited only by the inherent deformability of the O-ring itself. Since adequate threads 19 and 22 are provided on the cylindrical extension 12 and the nut 20 respectively and the length of sleeve 26 exceeds the depth of the counterbore 16, adequate adjustment is provided so that the nut may be threaded to a position assuring satisfactory compression of the O-ring. In practice, it has been found that the O-ring may be adequately compressed to sealingly engage the surface of a tube which is as much as one sixteenth of an inch in diameter smaller than the diameter of passage 14.

By the principles of the invention above described, there is provided a vacuum fitting which is of simple construction and which may readily be assembled over a tube but which also assures the proper sealing of the system. The adjustability of the fitting hereinabove described is of particular practical importance since there is considerable variation between the outer diameters of commercially available tubing. Any variance in the tolerances of the tubing with the above described fitting can be compensated for merely by tightening up the nut to a greater or less degree and thereby putting a compensating variable squeeze on the O-ring.

Additional modifications and changes will suggest themselves to those having ordinary skill in the art. Changes such as these are contemplated by the principles of this invention so that although for ease of description, the principles of the invention have been set forth in connection with but a single illustrated embodiment, it is not intended that this illustrated embodiment nor the terminology employed in describing it be limiting.

The invention claimed is:
1. A vacuum fitting comprising:
   a body;
   a cylindrical extension on said body, said extension having a radial face;

a passage having an axis extending through said body and said extension;

a cylindrical counterbore in said extension coaxial with said passage;

inwardly tapering shoulder means extending between said counterbore and said passage; wall means defining said passage, counterbore and shoulder means;

external thread means on said cylindrical extension;

nut means having a wall portion defining a cavity adapted to receive said cylindrical extension in threaded engagement;

said nut means including a radially inwardly directed flange defining an opening, with the diameter of the opening being substantially equal to the diameter of said wall means defining said passage through said body;

O-ring means in said counterbore adjacent said tapered shoulder;

cylindrical sleeve means having one end extending into said counterbore with said O-ring means being interposed between said end of said sleeve and said tapered shoulder means; said one end of said sleeve extending substantially normal to the axis of said passage;

said end of said cylindrical sleeve means having an outer diameter closely mating with the wall means defining said counterbore and having an inner diameter substantially equal to the diameter of the wall means defining said passage;

said sleeve further including a radially extending peripheral flange at the other end thereof with the diameter of said flange being greater than the diameter of the wall means defining the counterbore and closely fitting with the walls of the cavity in said nut means, said radially extending flange having radial faces on either axial end thereof, and an axial length such that one of said radial faces engages the nut and the other said radial face is spaced from the end of the radial face on the cylindrical extension of said body when said one end of the cylindrical sleeve means abuts the wall defining said shoulder means; and said means defining said shoulder and said one end of said sleeve means together substantially defining a V-shaped groove opening into said passage, said O-ring means being deformed radially inward by said shoulder and one end for sealing engagement with a tube which may have an outer diameter substantially less than the diameter of the wall means defining said passage.

2. The fitting of claim 1 wherein the O-ring is adapted to be deformed radially inward at least one sixteenth of an inch.

References Cited

UNITED STATES PATENTS

| | | | |
|---|---|---|---|
| 695,071 | 3/1902 | Mooney | 285—354 X |
| 845,085 | 2/1907 | Hicks | 277—110 |
| 868,377 | 10/1907 | Wands | 285—348 X |
| 2,017,717 | 10/1935 | Heeter | 285—356 X |
| 2,044,768 | 6/1936 | Brelsford | 285—356 X |
| 2,422,158 | 6/1947 | Wolfrom | 285—233 |
| 2,958,548 | 11/1960 | DeVienne et al. | 285—177 X |

FOREIGN PATENTS

| | | |
|---|---|---|
| 356,507 | 7/1930 | Great Britain. |
| 1,192,423 | 4/1959 | France. |

DAVID J. WILLIAMOWSKY, Primary Examiner

D. W. AROLA, Assistant Examiner

U.S. Cl. X.R.

285—356